Nov. 25, 1941.  J. C. FINDLAY  2,264,201
LIVESTOCK SPRAYING APPARATUS
Filed March 12, 1941  2 Sheets-Sheet 1
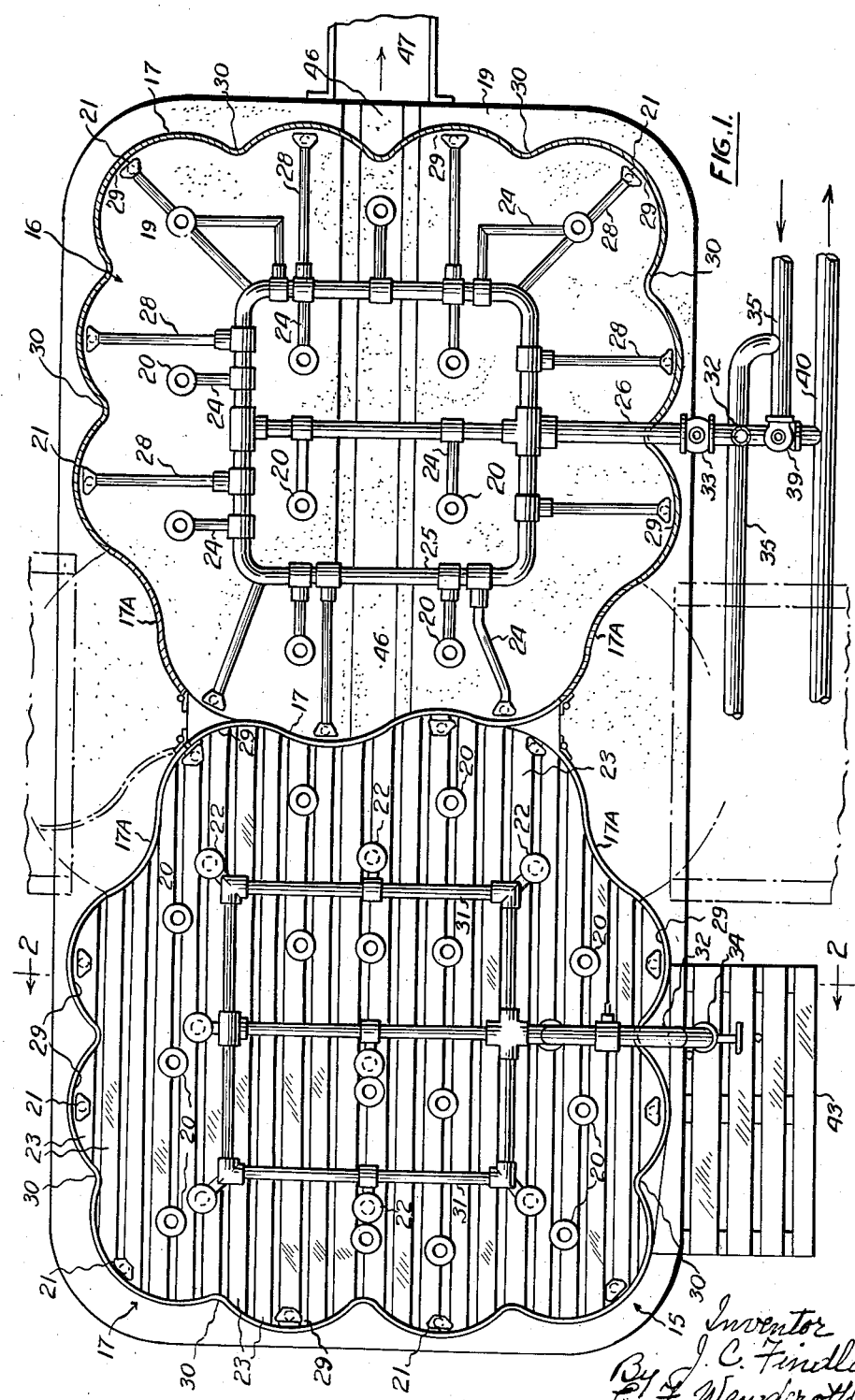

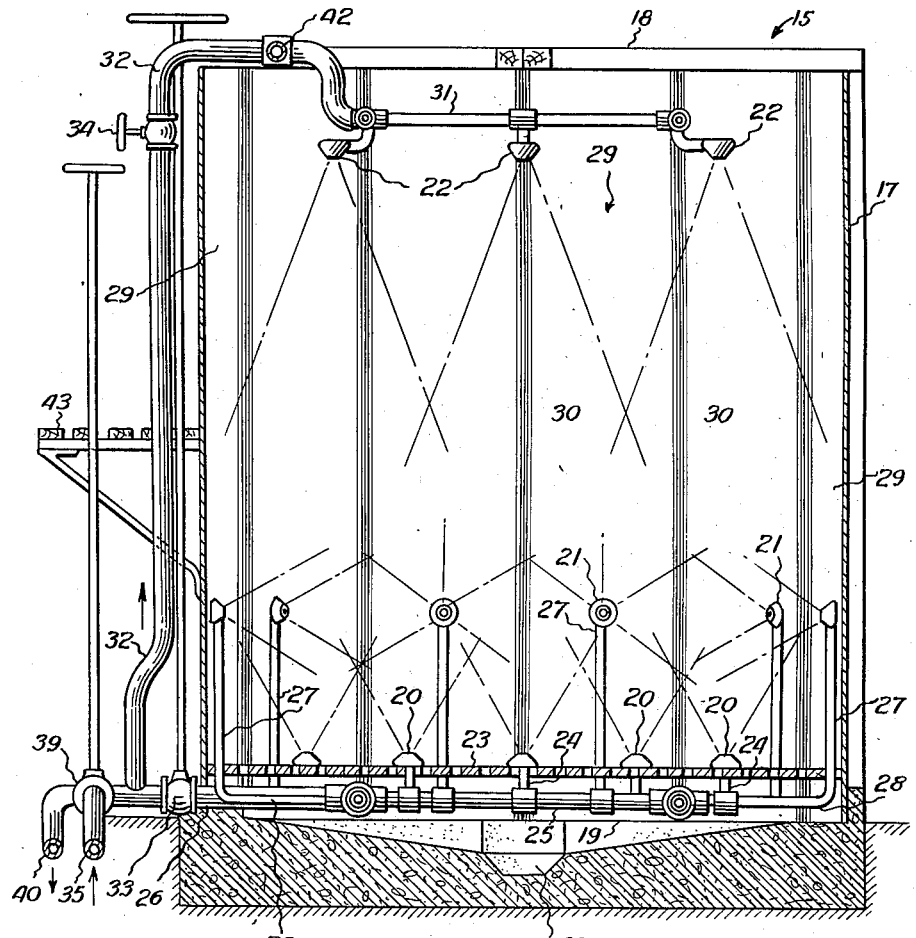
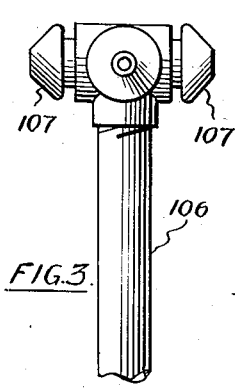
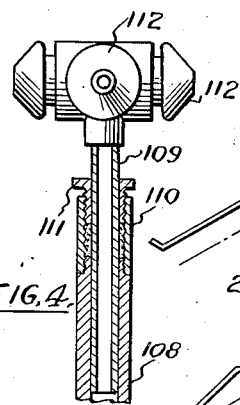
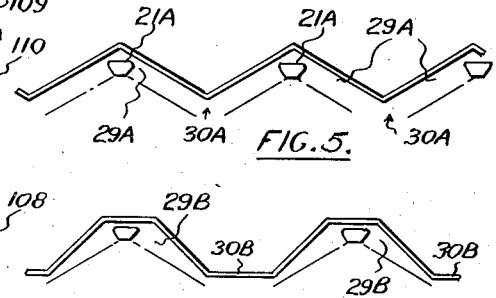
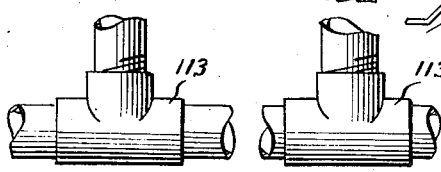

Patented Nov. 25, 1941

2,264,201

UNITED STATES PATENT OFFICE 2,264,201

LIVESTOCK SPRAYING APPARATUS

James Chrichard Findlay, Queenscliff, near Manly, New South Wales, Australia

Application March 12, 1941, Serial No. 383,000
In Australia February 27, 1940

1 Claim. (Cl. 119—159)

This invention relates to livestock spraying apparatus of the class comprising a spray pen having a multiplicity of floor, side, and overhead nozzles therein, an external pipe circuit connecting said nozzles and a drain in the floor of said pen.

The object of this invention is to increase the efficiency of the spraying operation and of apparatus of the class referred to by the provision of means whereby thorough drenching, spraying or jetting of the animals by the cleansing liquid is assured.

In the accompanying drawings, which are more or less schematic:

Fig. 1 is a plan of a pen having two spray compartments. Certain parts have been omitted for clearness.

Fig. 2 is a sectional elevation taken on line 2—2 in Fig. 1;

Fig. 3 is a side elevation of a multi-jet stand pipe which may be optionally included in the floor nozzle system of the pen;

Fig. 4 is a partly sectioned side elevation of a multi-jet stand pipe which is similar to that shown in Fig. 3, with the exception that its height may be varied; and Figs. 5 and 6 are fragmentary plan views of modified forms of pen walls.

The pen consists of two compartments 15 and 16, each comprising side walls 17 and doors 17A. The walls are stayed by top cross bearers 18, and they are erected upon a drainage floor 19. The pen compartments are furnished with floor nozzles 20, side nozzles 21 and overhead nozzles 22. Duck-board planking 23 is positioned just below the nozzles 20, and these nozzles are secured on the ends of branch pipes 24 extending from bottom headers 25 which are fed with spray fluid through supply pipes 26. The side nozzles 21 are fed through stand pipes 27 and branches 28 from the headers 25, and these side nozzles are each located in alcoves 29, preferably being centred between the vertical projections 30 which define the vertical boundaries of the alcoves. The alcoves 29 are preferably arcuate as shown in Fig. 1. They may, however, take other shapes whereby vertical projections which define the alcove edges are formed, and in which a side nozzle on a stand pipe may be positioned. By way of example Fig. 5 illustrates triangular alcoves 29A having projections 30A equally spaced between side nozzles 21A, and Fig. 6 similarly illustrates trapezoidal alcoves 29B having flat projections 30B. The overhead nozzles 22 are branched from top headers 31 which are fed through supply pipes 32.

The supply pipes 26 and 32 are equipped with individual flow control valves 33 and 34 to which liquid is fed through supply mains 35. By-passing valves 39 are provided to enable the fluid to be short circuited back to a source of supply through return pipe 40, thus allowing all the valves 33 and 34 to be closed without halting the action of a pump (not shown).

The supply pipes 32 may be each equipped with a small branch union as indicated at 42, whereby a flexible hose having a nozzle and control valve therein may be coupled in known manner to the pipes 32, in order to enable an operative (on platform 43) to direct an extra jet of fluid into the pen as may be required.

Used liquid falling on to the floor 19 drains into channel 46 which inclines downwardly towards a filter station (not shown). The liquid emerges from the pen by way of chute 47.

If desired the pen may consist of only one compartment such as 15 or 16; twin pens (as illustrated in the drawings) are a preferable arrangement however, as in such case spraying of livestock may proceed continuously, a sprayed batch of animals being discharged from a compartment and a fresh batch marshalled into that compartment while a batch in the other compartment is being sprayed.

The projections between the wall alcoves prevent animals lodging in "blind" spots between spray nozzles in order to avoid drenching, and the arcuate or hollowed out shaping of the alcoves has the effect of goading the animals into continuous milling movement within the pen, thus ensuring complete drenching of all of them. An animal attempting to avoid the spray by entering an alcove at one side thereof, is forced to follow a roughly arcuate path, and when the jet of the nozzle in the particular alcove is encountered, the animal turns away from it, thus returning to the pen area of full spray intensity.

The nozzles are of known construction, being of a conical form having a jet orifice in the apex. The conical nozzles present blunt points which discourages animals from standing on the floor nozzles or leaning against the wall nozzles.

The pen doors 17A may have nozzles thereon, connected by flexible hoses to one of the liquid headers.

It will be readily appreciated that by making the construction of sheet metal, the entire apparatus may be rendered portable by building the pen on the deck of an automotive or trailer vehicle.

It will be clear that the wall nozzles 21 (Fig. 2) will function as jetting nozzles provided the height of the stand pipes 27 is selected to suit the particular class of animals to be treated within the pen, and that jetting of animals may be effected with greater efficiency if extra nozzles of suitable height are provided within the pen. Consequently if the apparatus is required to perform a jetting operation rather than an ordinary spraying operation, the floor nozzles 20 may be removed and replaced by nozzled stand pipes such as those shown in Fig. 3 or Fig. 4.

In Fig. 3 the stand pipe 106 at top carries a plurality of variously directioned nozzles 107.

In Fig. 4 the stand pipe consists of two parts 108 and 109. A stuffing box 110 prevents liquid leakage and the gland nut 111 provides a means of retaining the pipe part 109 at a selected height. The part 109 carries nozzles 112 similar to those shown in Fig. 3.

I claim:

A housing structure for animals for spraying purposes comprising two compartments, each having undulating walls of substantially continuous extent, a portion of the walls of both compartments constituting a common wall, doors for said compartments, said doors being hinged on the common wall, the undulations in the common wall providing recesses and projections, recesses of the common wall for one compartment constituting the projections of the common wall of the other compartment, and sprays in the compartments, whereby animals in any portion of each compartment will be drenched by liquid emitted from the sprays.

JAMES CHRICHARD FINDLAY.